United States Patent [19]

Gil

[11] Patent Number: 4,868,757

[45] Date of Patent: Sep. 19, 1989

[54] COMPUTERIZED INTEGRATED ELECTRONIC MAILING/ADDRESSING APPARATUS

[75] Inventor: Asher Gil, Houston, Tex.

[73] Assignee: Pi Electronics Corporation, Houston, Tex.

[21] Appl. No.: 883,878

[22] Filed: Jul. 9, 1986

Related U.S. Application Data

[63] Continuation-in-part of Ser. No. 562,313, Dec. 16, 1983.

[51] Int. Cl.⁴ .................... G07B 17/02; G01G 19/413

[52] U.S. Cl. ............................ 364/464.03; 177/25.15; 364/464.02

[58] Field of Search .............. 364/464, 464.02, 464.03, 364/466, 559; 380/23, 29; 177/25.15

[56] References Cited

U.S. PATENT DOCUMENTS

| | | | |
|---|---|---|---|
| Re. 30,957 | 6/1982 | Feistel | 380/29 |
| 2,688,878 | 9/1954 | Kolisch | 364/466 X |
| 2,689,082 | 9/1954 | Kolisch | 364/466 X |
| 2,812,904 | 11/1957 | Kolisch | 364/466 X |
| 3,436,968 | 4/1969 | Unger et al. | 364/466 X |
| 4,024,380 | 5/1977 | Gunn | 235/487 X |
| 4,122,532 | 10/1978 | Dlugos et al. | 364/900 |
| 4,377,214 | 3/1983 | Hansen et al. | 177/25.15 |
| 4,506,330 | 3/1985 | Dlugos | 177/25.15 X |
| 4,641,346 | 2/1987 | Clark et al. | 380/23 X |

*Primary Examiner*—Parshotam S. Lall
*Assistant Examiner*—Edward R. Cosimano
*Attorney, Agent, or Firm*—Ezra L. Schacht

[57] ABSTRACT

An apparatus capable of automatically handling envelopes through various stages of processing, including electronic display of the envelope, electronic weighing of the envelope and printing of a stamp, date, time, location and ZIP+4 code in numerical and bar code form, name/address, advertising messages; maintaining mailing lists; maintaining and printing postage records; securing postage usage; buying postage electronically; retrieving user postage usage information; electronic keeping of time and date; updating of postage rates, ZIP+4 directory and mailing list; and having an integrated built-in ZIP+4 directory.

9 Claims, 9 Drawing Sheets

COMPUTERIZED INTEGRATED ELECTRONIC MAILING/ADDRESSING APPARATUS

CROSS-REFERENCE TO RELATED APPLICATIONS

The present application is a continuation in part of copending patent application Ser. No. 06/562,313, filed Dec. 16, 1983, entitled "Computerized Integrated Electronic Mailing/Addressing Apparatus".

BACKGROUND OF THE INVENTION

At the present time the state of art of mailing systems is a combination of an electronic postage computing scale, and a postage meter that can be electronically activated and sets itself on the denomination. Some mailing systems also include an accounting accumulating printer. The systems also sometimes include elements of a microcomputer which are used to perform some calculations. However, every envelope must still be manually handled by placing it on a scale, and then either applying a stamped tape to the envelope or feeding the envelope through the meter. The printing of the stamp on the envelope is still done by die-casted numbers and die-casted plates. In all of the existing mailing systems, the printing of the stamp is based on the same metering device developed at the early part of the century. The electronic components added to these systems are merely "add-ons", which are used to manipulate the gears which set up the stamp value.

In all the existing postage meter systems, the setting up of the date is still done manually by means of moving mechanical levers.

The method used today to load postage into the existing meters involves the resetting of the gear mechanism, which is a mechanical counting device. The resetting of the gears is done manually, either by the post office or by turning a special knob on the more advanced postage meters (remote meter resetting system). The turning of the knob in these meters turns the gears, which are the mechanical counting system. In both methods, the postage meters can be easily tampered with, thus allowing the machines to be used by criminals to defraud the post office.

At the present time none of the existing mailing systems has the ability to locate ZIP+4 codes, translate the nine-digit ZIP+4 into a bar code form and then print the bar code in a very precise location on the envelope. The ZIP+4 bar code is indispensable to automated mail sorting systems deployed by the post office. The bar code is an exact translation of the address information and allows the mail to be sorted electronically instead of manually.

The computerized electronic mailing/addressing apparatus described herein has the ability to search the ZIP+4 directory of the United States, which is a massive directory with a total of 2.4 gigabytes of data. This directory is installed on laser discs. The apparatus will locate the correct ZIP+4 code and will translate the ZIP+4 code into a bar code form and print the bar code on a defined location on the envelope. Without the ZIP+4 bar code printed on the envelope in the correct location, the post office bar code sorters cannot sort the envelopes.

The apparatus will electronically weigh the envelopes and optically measure the size of the envelope. It will calculate the correct postage and print the stamp by means of a floating head dot matrix printer, the bar code and any other additional information required by the user. The apparatus has a built-in automated envelope feeding mechanism that transfers the letter from station to station and requires the user to only handle the envelope once. The feeding mechanism will move the envelope from one station to the other according to a computer program which is incorporated in the apparatus. The postage will be accurately calculated using the correct ZIP+4 codes and the correct weight. This will eliminate the possibility of human error.

The daily task of setting up the date on existing postage meters is completely eliminated by incorporating an electronic real-time clock as part of the computer system.

By using the special post office control unit which is loaded electronically by the post office computer, the occurrence of fraudulent use will be completely eliminated. The post office control unit will be part of the computerized integrated mailing/addressing apparatus. This apparatus will not operate unless this control unit is connected to its computer. This control unit will be used to buy postage from the post office, either by bringing this very small unit to the post office or by using a modem unit to load the postage by communicating with the post office computer. This control unit will keep a permanent record of the amount of postage used to date and the number of envelopes sent out by a specific machine. This control unit will be tamper proof and will self-destruct in the event of any tampering. The only way in which postage can be loaded into this unit will be through an electronic code which only the post office will possess.

The invention relates to the methods and means for applying postage and ZIP+4 bar codes on envelopes using an electronic display to display the envelopes, using the keyboard to enter the address information, using the integral electronic weighing system to weigh the envelope; using an electronic optical system to measure the envelopes; and using the zip code searching program to find the proper ZIP+4. The computer will then instruct the special floating head dot matrix printer to print on the envelope in a precise location the stamp, which includes the value, the date, time, location; and then print the ZIP+4 code in both numerical and bar code form. A mailing list program may be included as part of the computer software. This program will allow for the printing of names and addresses simultaneously with the stamping of the envelopes. Updating programs may be included as part of the computer software and will enable the user to update postal rates, and mailing lists. The United States ZIP+4 directory is contained on laser discs and can be easily updated by modifying the master disc and by stamping new discs.

SUMMARY OF THE INVENTION

This invention comprises a method and means for stamping envelopes with the correct postage according to the weight of the envelopes, the correct ZIP code and the correct postal rates. This invention also comprises a method for finding the correct ZIP+4 code related to a certain address and printing the relevant ZIP+4 bar code in a precise location on the envelope. The apparatus will use a floating head dot matrix printer or ink-jet printer to print on the envelope the stamp with the correct value, date, time, location and the ZIP+4 bar code in numerical and bar code form. When used in conjunction with a mailing list program, the apparatus will use the floating head dot matrix printer to simultaneously print on the envelope the name and address required. The postage will be bought electronically, either by bringing the post office control unit to a post office or by using a modem unit to directly connect the control unit to the post office computer.

The general object of this invention is accordingly to offer the users a flexible computerized integrated electronic mailing system capable of stamping and ZIP+4 bar coding of envelopes.

Another object of this invention is to allow the electronic sorting of envelopes by using the ZIP+4 bar code printed on the envelope.

Another object of this invention is to substantially lower the costs involved in handling mail and stamping envelopes.

Another object of this invention is to provide the operators with complete ZIP+4 directory and to allow for quick search of a ZIP+4 code related to a certain address. This invention allows access to the ZIP+4 directory to any operator using the apparatus without having the necessity to use the main frame computer for the purpose of this directory and this search.

Another object of this invention is to eliminate the mechanical system of setting up postage charges, setting up the dates, and accounting for the postage utilizing a mechanical system.

Another object of this invention is to offer the post office an electronically secure system that will virtually eliminate the possibility of tampering and fraudulent use of postal meters.

Another object of this invention is to provide the operators with built-in mailing list program.

Another object of this invention is to provide a computerized postage record keeping system for both the user and the post office.

Briefly, the invention accomplishes the above cited objects by incorporating all the components necessary in processing envelopes into one integrated computerized electronic mailing/addressing apparatus.

Other and further objects, features and advantages will be apparent from the following description of a presently preferred embodiment of the invention, given for the purpose of disclosure and taken in conjunction with the accompanying drawings.

DESCRIPTION OF THE PREFERRED EMBODIMENT

General

Figure 1:
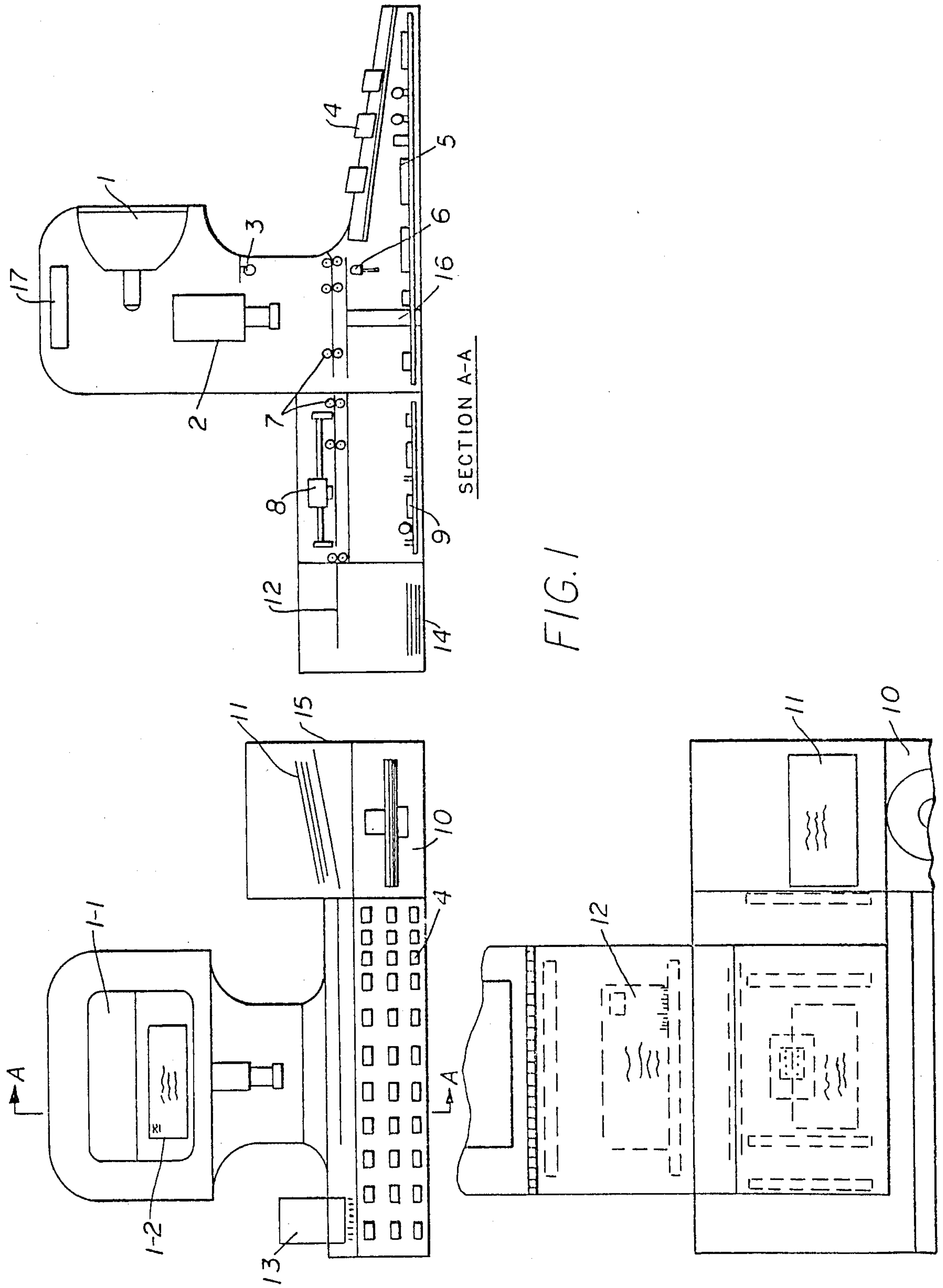
FIG. 1 is a front, top, and side view of the computerized integrated electronic mailing/addressing apparatus of the present invention.

FIG. 1 shows the computerized integrated electronic mailing/addressing apparatus, including these sub-units: a computer 5 which incorporates an alphanumeric keyboard 4; and an electronic display screen 1. The display screen 1 is split into two sections. Section 1-1 displays the computer input and section 1-2 shows a video picture of the envelope being processed. Also shown are: a video scanning camera 2, splitter box 17, disc drives 10, which may include hard discs, floppy discs and laser discs; high-intensity light 3 and photocells 6; a load cell 16 for weighing the envelope being processed; a floating-head/platen printer 8 and a printer-interface board 9; an adjustable chute 15 which feeds the envelopes to be processed into the mechanical handling system 7 (which may include a roller system or a mechanical clamping system); and a collection chute 14 which collates the processed envelopes 12.

The Microcomputer System

Figure 4:
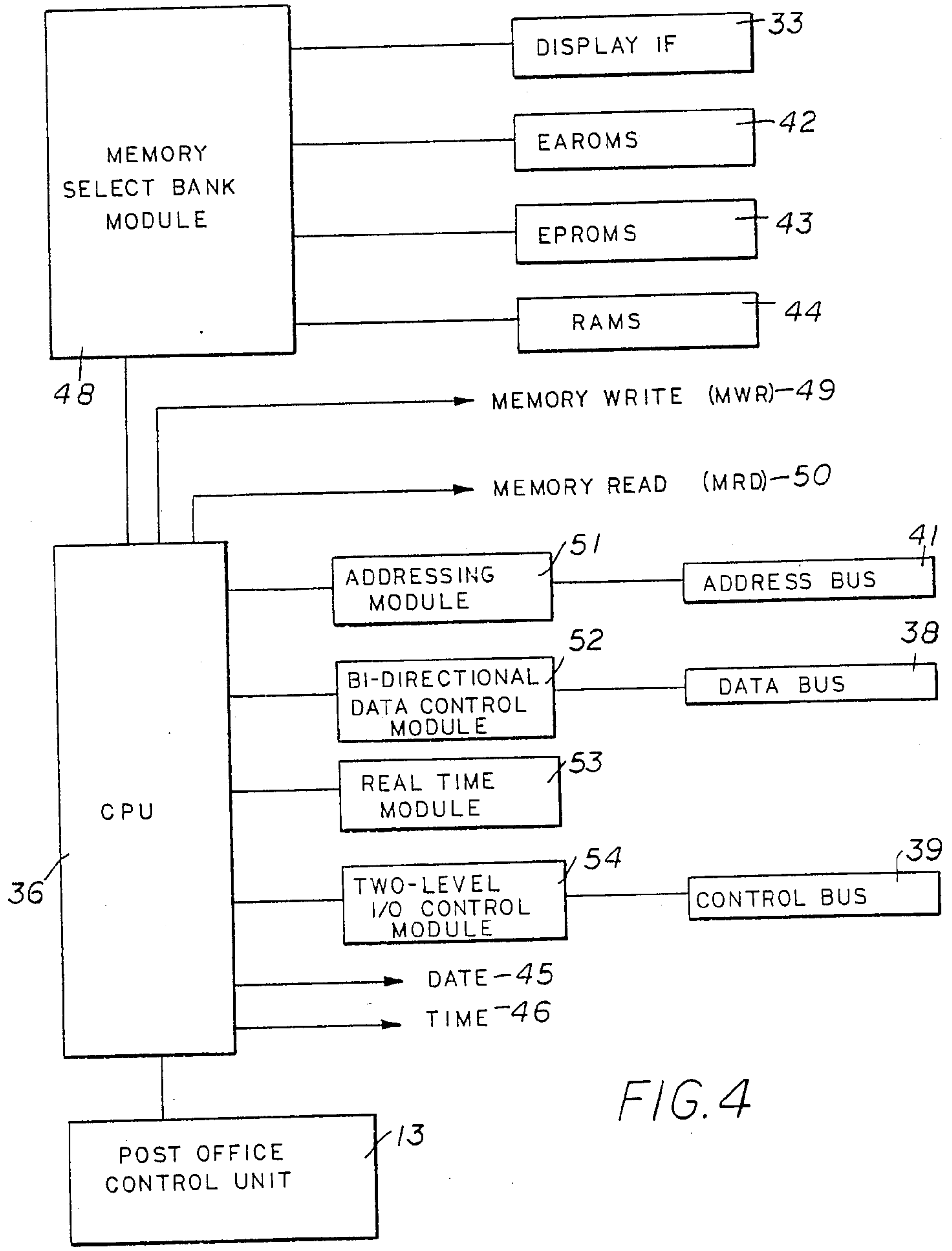
FIG. 4 is a schematic block diagram of the microcomputer system.

In FIG. 4 it is shown the microcomputer system, which consists of the following components, and is capable of high-speed operation in real-time with multitasking capabilities. A Central Processing Unit (CPU) 36 consists of the following modules: The Addressing Module 51, connected to an Address Bus 41; a Bidirectional Data Control Module 52 is connected to the Data Bus 38; a Real-time Module 53; and a two-level input-output Control Module 54, connected to the Control Bus 39. The CPU 36 is directly connected to the Post Office Control Unit 13 and to the Memory Bank Select Module 48. Module 48 is connected to EAROMs Memory Bank Select Module 48. Module 48 is connected to EAROMs 42, EPROMs 43, RAMs 44, and Display Interface 33.

The CPU 36 not only performs all control and address functions, but also performs a Memory-Write function (MWR) 49 and Memory-Read function (MRD) 50. The CPU 36 also generates the Data 45 and the Time 46, using its internal clock. The alphanumeric keyboard 4 is a conventional type. Once the operator starts the apparatus by turning on the master switch, the split screen section 1-1 will display the computer instructions. Once an envelope is fed by the mechanical roller 7 system, the envelope will move until such time that it will be displayed on the split screen section 1-2. The operator will read the address information and enter this information, which includes street number; street name; city and state or the five digit zip code, using keyboard 4. The information entered by the operator is displayed on section 1-1 of the electronic display screen 1 for comparison to the address information displayed on display screen 1-2. Once this comparison is made and found correct, the operator will press the enter key to confirm acceptance. The computer 5 will use the address information to begin a search for the ZIP+4 code utilizing disc drive system 10 which includes the hard disc and a number of laser discs. While the search is going on, the computer 5 will receive the weight information from the load cell 16 and the size of the envelopes from photocells 6. Once the operator selects the postal rate desired by utilizing the keyboard 4, the computer 5 will calculate the required postage. Once the ZIP+4 search is completed, the computer will translate the numerical ZIP+4 into a bar code form and will instruct the floating head printer 8 to print the stamp and the ZIP+4 bar code in the precise locations which are designated by the post office. The computer 5 will also control the mechanical feeding mechanism and will start by feeding the envelopes 11 to be processed from feeding chute 15 and then will move the envelope 11 from one station to another each time the operator presses the enter key on the keyboard 4.

The Electronic Display Unit

The electronic display unit 1 consists of a composite type high resolution video screen. By utilizing a special split screen unit, this electronic display can be divided into two separate screens. Screen 1-1 displays computer input and output and screen 1-2 displays a video picture of the envelope 11 to be processed. The video image on screen 1-2 is generated by utilizing a conventional type video camera, or a more advanced type charge coupled device (CCD) camera. The electronic display unit is connected to the computer 5 by means of a conventional high resolution video interface unit.

Disc Drive System

The disc drive system 10 includes a hard disc with a minimum capacity of a 10 megabytes and a number of laser discs which contain the complete ZIP+4 directory for the United States. The disc drive system 10 is connected to the computer 5 through a specially designed interface.

The Printer Unit

The printer unit 8 is a floating head printer. The floating head printer floats over the envelope to be printed by means of a specially controlled stepper motor. This printer will move in two axis, X and Z, while the envelope moves in the Y direction. The floating head printer was specially developed to allow the printing on various thicknesses and sizes of envelopes. This printer will print the stamp, the ZIP+4 code in both numeric and bar code form, advertising messages and any other information required.

Letter Feeding Mechanism

The letter feeding mechanism 7 includes a series of rollers or clamps which are connected to stepper motors. These stepper motors are controlled by computer 5. The feed unit chute 15 will feed one envelope at a time into the roller system. The rollers will then move the envelope 11 to be processed from one station to another according to signals from computer 5.

Method of Operation—Major Component Systems

Figure 5:
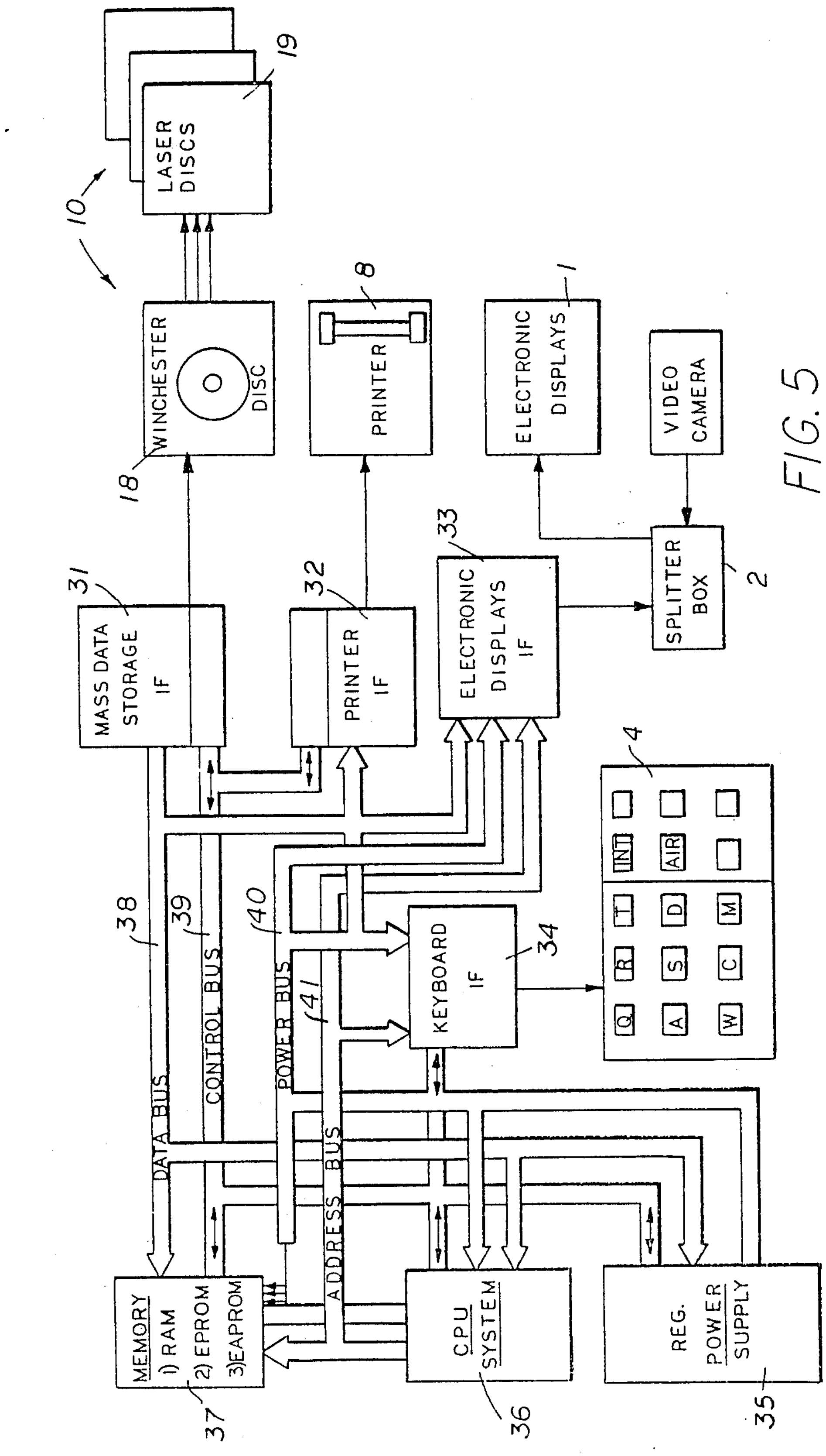
FIG. 5 is a schematic block diagram of the major electronic systems.

FIG. 5 is a schematic block-diagram of the major components: The computer 5, showing the interconnections between Regulated Power Supply 35, CPU 36, Memory 37, and between the major components that in combination comprise the electronic system of the Computerized Integrated Electronic Mailing/Addressing Apparatus.

These major components include: The Mass Data Storage Interface 31, which controls the Winchester Disc 18 and Laser Discs 19; the Printer Interface 32 which controls the Printer 8; the Electronic Displays Interface 33 which utilizes the Splitter Box 17, which in turn splits the Electronics Display 1 into two sections, displaying simultaneously both the Computer Output and output of Video Camera 2. The Keyboard Interface 34 controls the Keyboard 4. The Data Bus 38 is utilized to receive and and transmit data to and from the CPU 36. The CPU system 36 is used to control Bus 39 to control in turn, the major components. The Power Bus 40 is used to transmit power to the major components. The Address Bus 41 is used by the CPU System 36 to address the major components.

Figure 6:
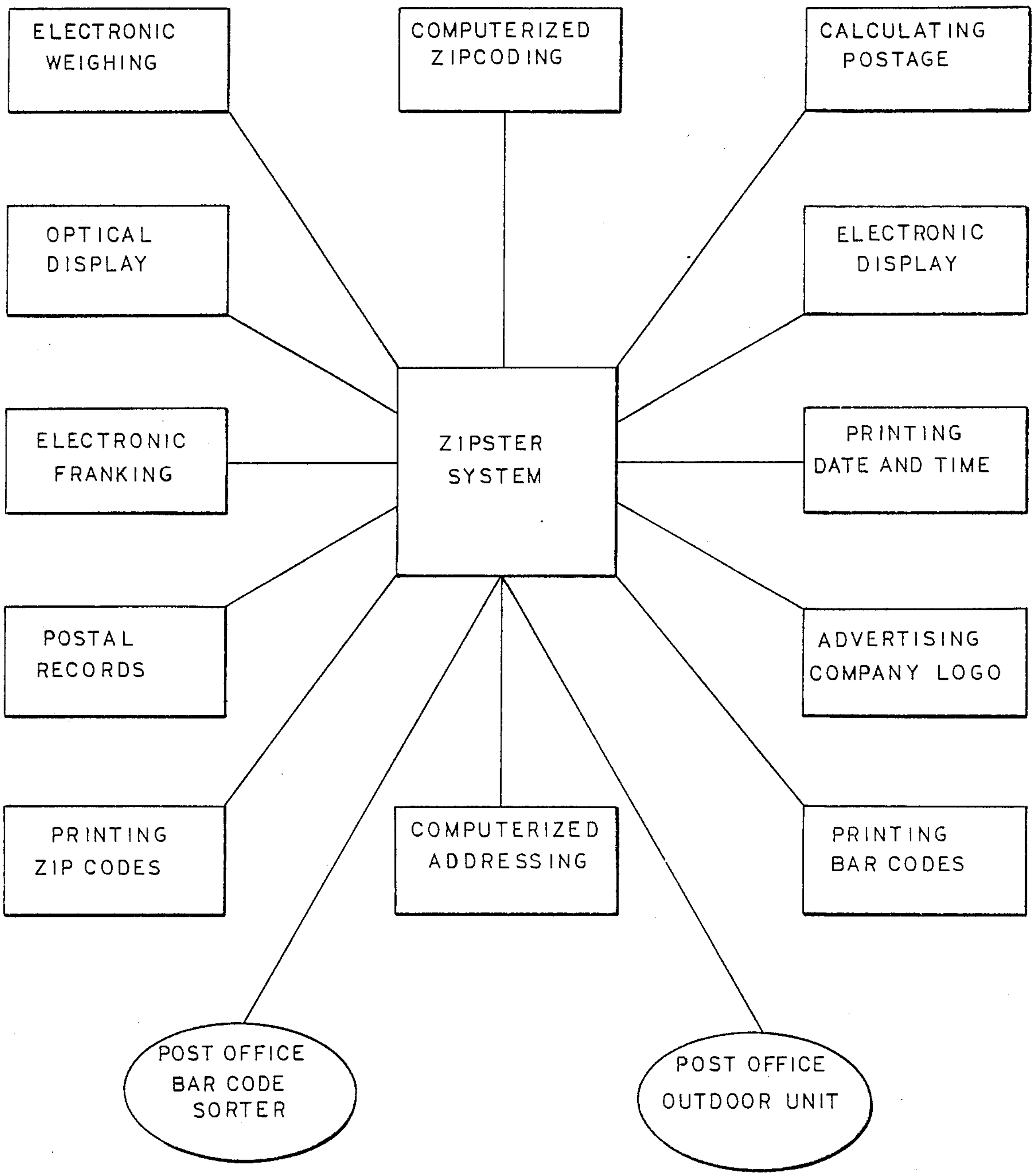
FIG. 6 is a schematic drawing showing the various functions integrated in the apparatus.

FIG. 6 illustrates how fully the "ZIPSTER" apparatus and method complements the present state-of-the-art Post Office central Barcode Sorter. Every step in the mailing process is coordinated by this apparatus, providing a completely automated procedure and method for present and yet undetermined future state-of-the-art mailing requirements.

It should be noted that such rudimentary state-of-the postal-art as using rubber-bands may be improved by substituting plastic or metal clamps, or other devices, for the securing of segregated bundles of letters, without departing from the spirit or scope of this invention.

Instructional Control Program

Figure 8:
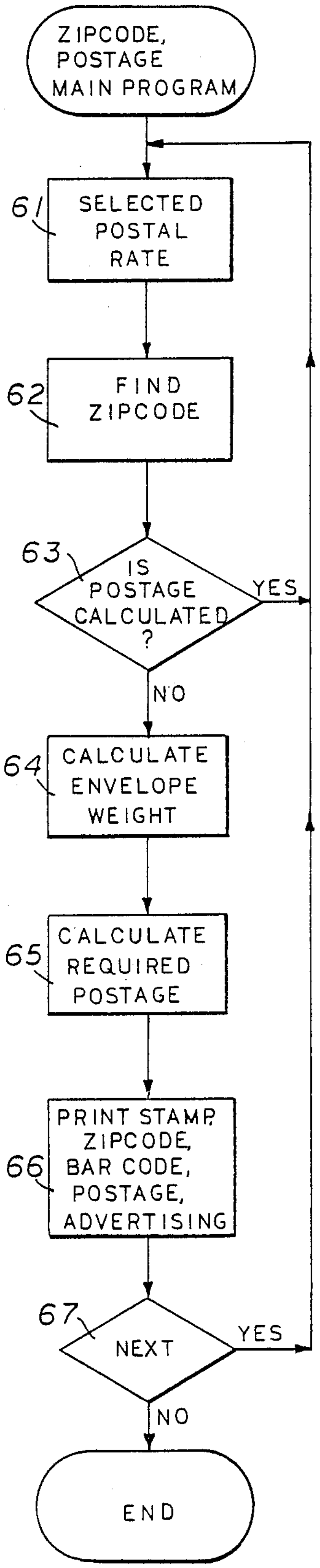
FIG. 8 is a logic flow chart of the ZIP code and postage program.
Figure 9:
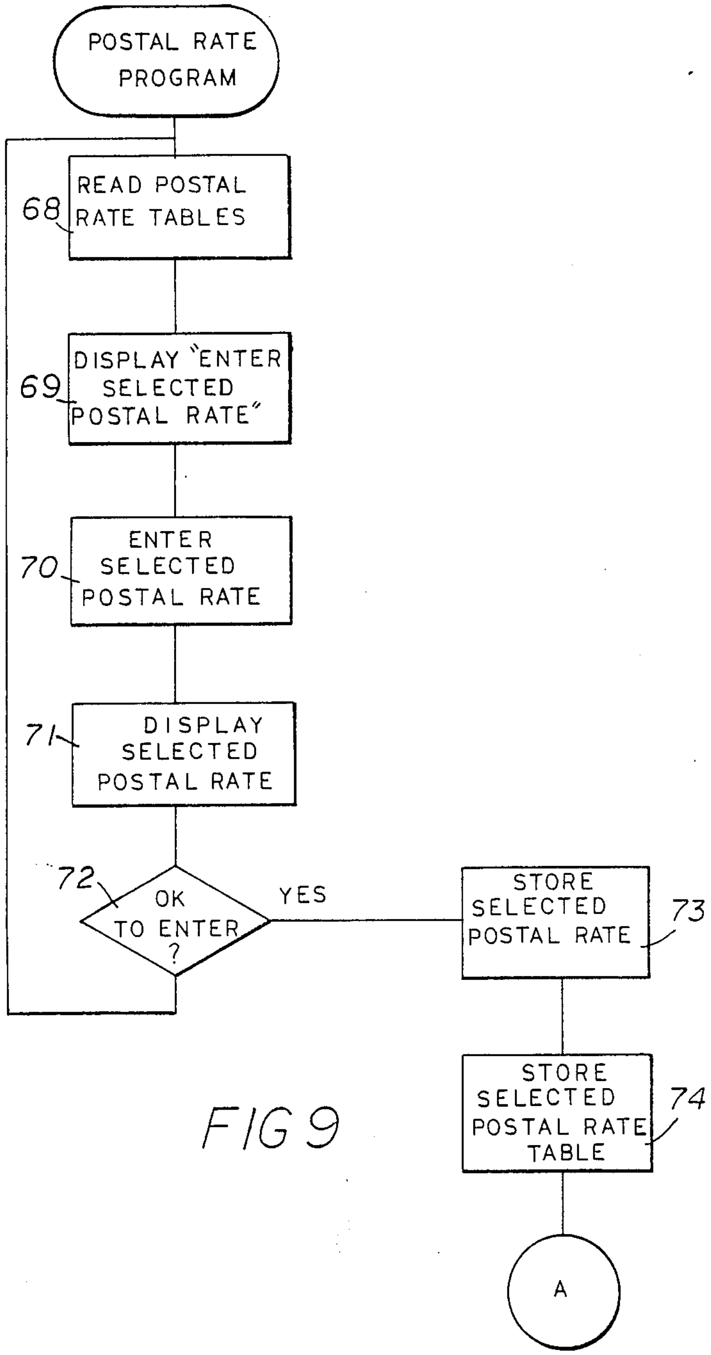
FIG. 9 is a logic flow chart of the postal rate program.
Figure 10:
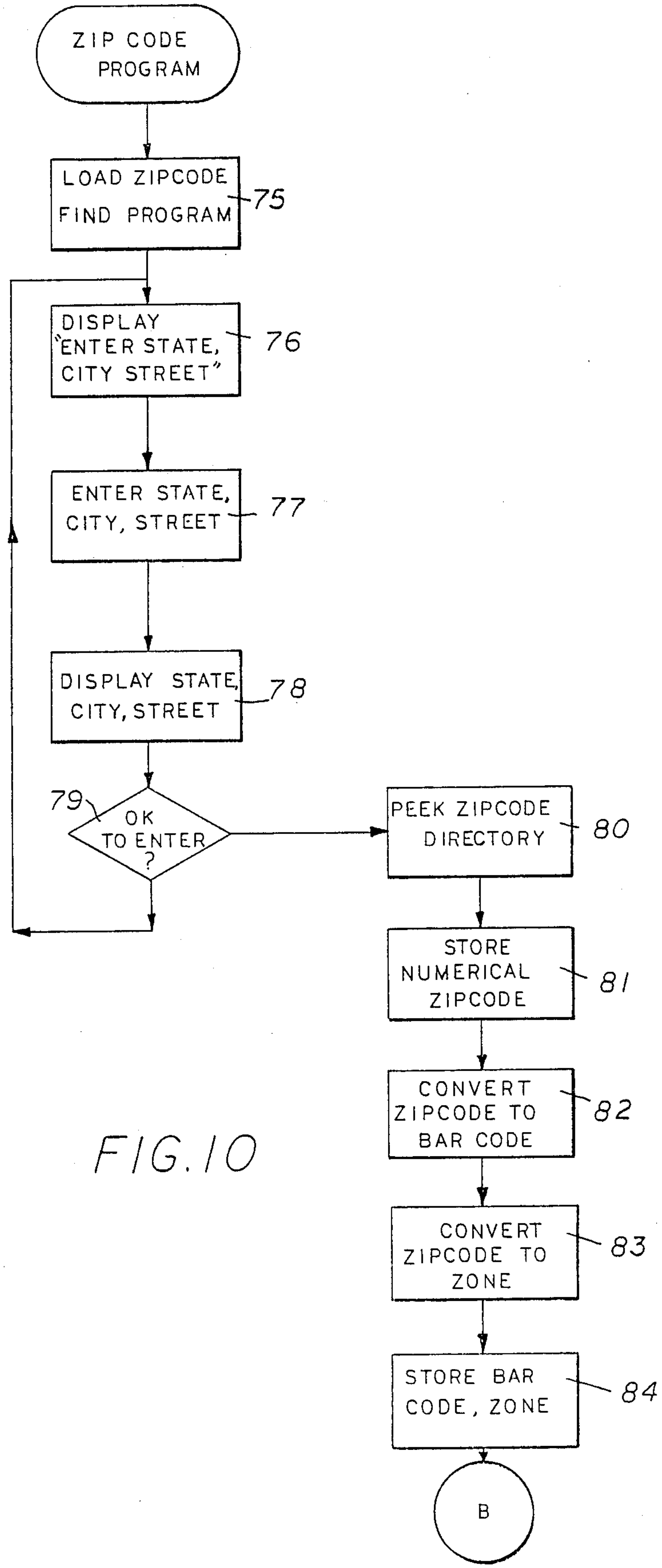
FIG. 10 is a logic flow chart of the ZIP+4 code program.

FIGS. 8 through 12 are various flow diagrams showing the instructional control program which is stored in the various EPROMS 43. In FIG. 8, once the power has been turned on, and the CPU initialized (step 60), the Zip Code Postage Main Program is loaded. This Zip Code Postage Main Program will go through the following steps. It will look for a Selected Postal Rate 61 and a Zip Code 62. If Postage Calculated 63 is "Yes", then go back to Selected Postal Rate 61, if "No", then go to Calculate Envelope Weight 64, calculate Required Postage 65, Print Stamp, Zip Code, Bar Code, Postage, Advertising 66. Next, 67 allows the operator to repeat the operation if "Yes" or if "No", to end the program. Once the power has been activated and the CPU is initialized, step 60, the Zip+4 code find program will be loaded into RAM, step 75 (FIG. 10). This program will assure that the CPU is searching the mass data storage in a step-by-step method in order to minimize the time required to locate a certain ZIP+4 code. The ZIP+4 code directory will be stored in the mass storage data, the laser discs 19, according to the main heading of states, sub-heading of cities, sub-headings of streets and then street numbers. Once the ZIP+4 find program is loaded, the computer will display "Enter-ZIP", "Enter Street and Number", step 76. Once the operator enters this data, step 77, which will be displayed, step 78, on the electronic display 1, the operator will have to confirm if the data is "Okay to Enter", step 79. If "yes", the CPU will peek into the ZIP+4 Directory, and if "no", the computer will return to Step 76. Once this is done, the CPU will peek into the ZIP+4 directory, step 80, will find the numerical ZIP+4 code and will store it in the RAM, step 81. It will then convert the numerical ZIP+4 code into a bar code and into zone information, step 82 and 83. It will then store the bar code and the zone information in the RAM, step 84, for future use.

Through the initialization step, the postal rate tables will be loaded into RAM, step 68 (FIG. 9). The electronic display will display a message "Enter Selected Postal Rate", step 69. Once the operator selects the postal rate, step 70, the postal rate will be displayed, step 71, and the operator will confirm that this postal rate is correct, step 72. In FIG. 9, OK to Enter (step 72) gives the operator the option to select "Yes", which the computer 5 will Store (as) Selected Postal Rate (step 73), then Store (in) Selected Postal Rate Table 74. If the operator selects "No", the program will go back to (step 69). Once the postal rate is confirmed the CPU will then store the selected postal rate, step 73, and at the same time will select the corresponding postal rate table, step 74.

Once these steps are completed, the computer will move the envelope from station C through station D to station E.

Figure 11:
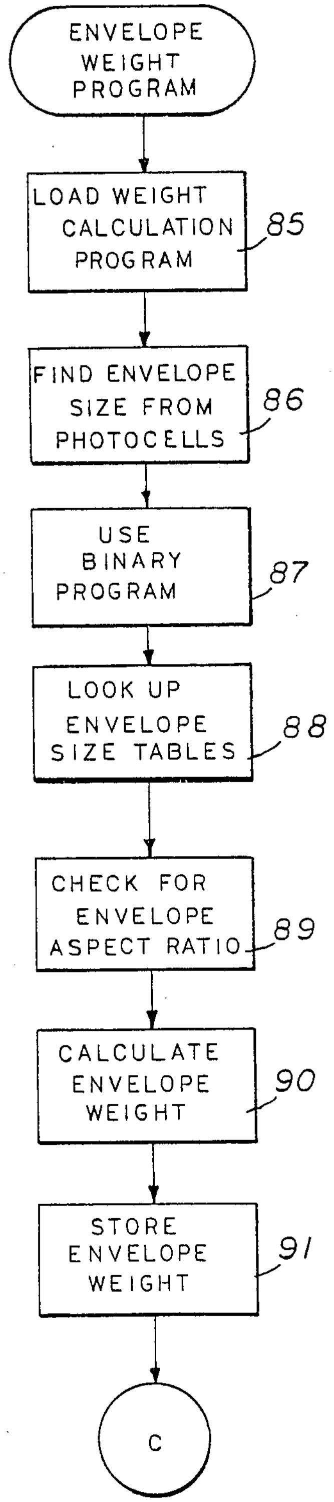
FIG. 11 is a logic flow chart of the envelope size and weight program.

In FIG. 11, the computer 5 will utilize the Load Weight Calculation Program (step 85). The computer 5 will then find the Envelope Size From Photocells (step 86), utilizing a Binary Program (step 87), Look Up Envelope Size Table (step 88), Check for Envelope Aspect Ratio (step 89), and then Calculate Envelope Weight (step 90) and Store Envelope Weight (step 91) for further use.

Figure 12:
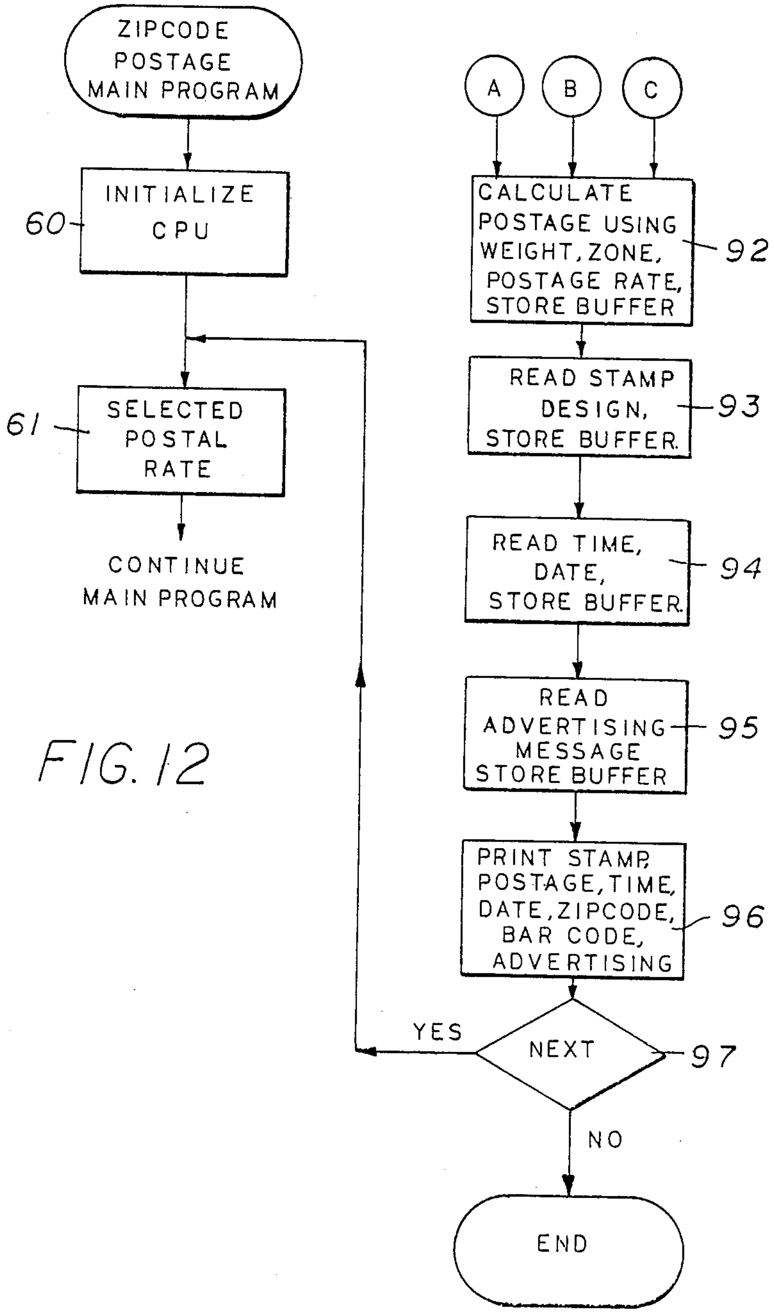
FIG. 12 is a logic flow diagram of the printing program.

In FIG. 12, Selected Postal Rate (step 61) of the Instructional Program requires the operator to select the Postal Rate. Once this is done, the program will continue through the other steps. Next, (step 97) allows the operator the option to choose "Yes" and go back to Selected Postal Rate (step 61), which is the starting point in processing an envelope, or choose "No" and exit the program.

In Step 92 (FIG. 12), the computer will use the information (ABC) stored in the RAM to calculate the postage by using the envelope weight, zone information and the postage rate tables. All of this information will then be transmitted to the printer buffer. Once this is done, the computer will read the stamp graphical design stored in the memory and will also store it in the printer buffer, step 93. The computer will also read the time and date from the real time module and will store it in the computer buffer, step 94. It will also check if any advertising message is stored in the memory, and if any message exists it will store it in the printer buffer, step 95. It will then instruct the printer to print the stamp, postage, time, date, numerical ZIP+4 code, ZIP+4 bar code, advertising, etc., step 96. Once the printing is finished, the computer will instruct the feed motors to move the envelope from the printer into the computer-selected chute. It will move the next envelope from station B to station E, and it will then move the next envelope from the feed chute into station B. Once this is done, it will again display the message "Enter Zip - Enter Street Name and Number".

Post Office Control Unit

Figure 7:
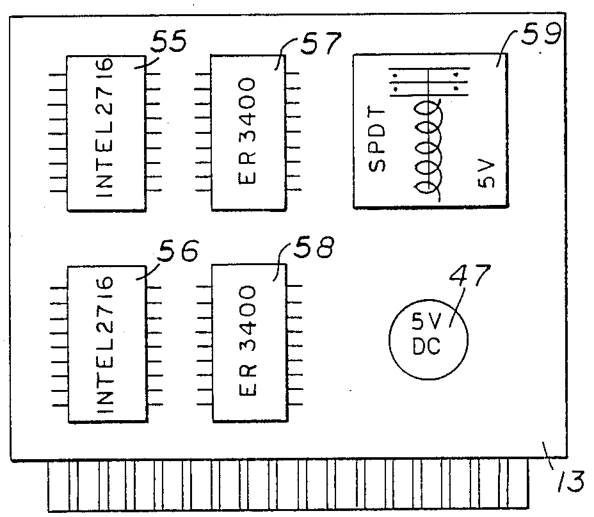
FIG. 7 is a schematic drawing of the post office control unit.

The post office control unit 13, FIG. 7, incorporates EPROMS 55 and 56, which will contain the special post office encryption cod and the operating and instructional control programs. The EPROMS used can be Intel 2716 or similar. The EAROMS 57 and 58 will contain information about the postage bought and the postage used. These EAROMS can be G.I.C. ER3400 or similar. The post office control unit will also include an SPDT (5v) relay unit 59 and a 5 volt DC miniature battery 47. By connecting the post office control unit to a modem unit, the post office computer will be able to load the EAROMS 57 and 58 with new postage as requested. At the same time they will be able to retrieve from the EAROMS information regarding postage used, weight of letters sent, or any other information the post office requires. In order to enter information into EAROMS 57 and 58, the post office computer will have to communicate with Post Office Control Unit 13 utilizing the electronic encryption. Attempting to load postage into the EAROMS 57 and 58 without utilizing the special electronic encryption stored in EPROMS 55 and 56, will result in actual physical destruction of the electronic circuitry. The destructions will occur as a result of relay unit 59 being activated by a command from EPROMS 55 and 56. This command will connect fusible links connecting EAROMS 57 and 58 with the 5 volt battery which will destroy these links and will render the post office control unit useless. The computer 5 will not operate unless the post office control unit is connected to its circuitry.

Method of Operation

Figure 2:
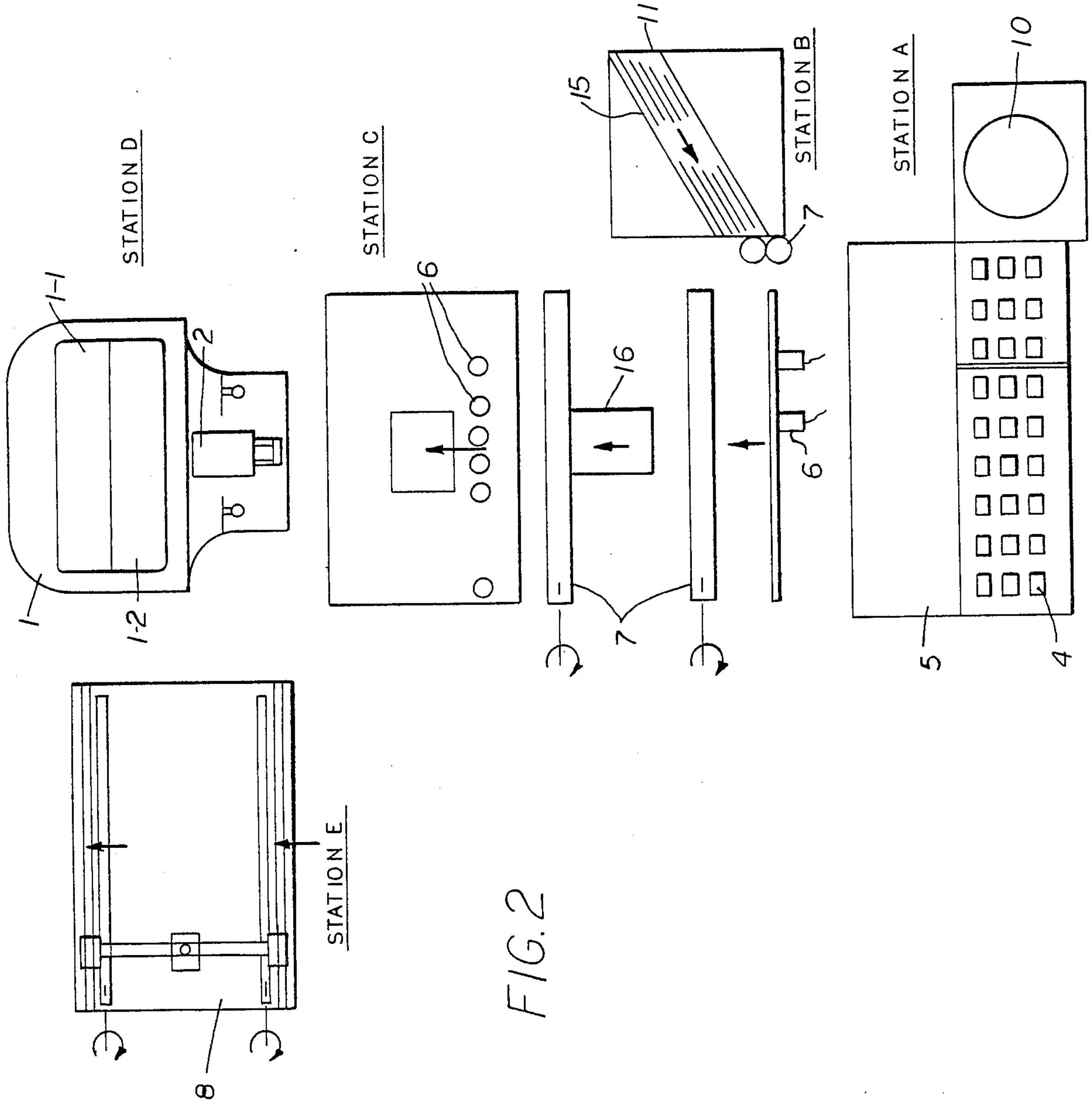
FIG. 2 is a schematic drawing showing the movement of the envelope through the various stations.

A schematic method of operation, FIG. 2, is used to explain the method in which the apparatus is operated.

Station A

The computer in station A will include the computer 5 with alphanumeric keyboard 4 and disc drive system 10. The operator will use the keyboard 4 to enter the address data into the computer. The operator will start the apparatus by turning the master switch to the on position. The operator will then select the program required, i.e. single letters or mailing list. If the mailing list is selected, the system will then operate automatically and continuously until all envelopes have been stamped, addressed and ZIP+4 bar coded. If single letters are selected, then by pushing the enter key, an envelope will be automatically fed to the electronic viewing station D in which will display the envelope utilizing the video camera 2 and then electronic display 1. The envelope will be displayed on section 1-2 of the screen. The operator will then enter the address information displayed on screen 1-2 into computer 5. The computer 5 in turn will display the input on section 1-1 of the electronic display 1. Once the operator compares the address on the envelope to the address he has just input and finds it to be correct, he pushes the enter key. The computer 5 will then search through the disc system 10 which includes the hard disc 18 and the laster discs 19 for the ZIP+4 code corresponding to this address. In addition to containing the complete ZIP+4 directory, the disc drive system 10 will also contain the postal rates, mailing list programs, operating programs and postage record keeping programs.

Station B

Station B includes the feeding chute 15, the feeding rollers 7 and a set of photocells 6. The envelope 11 to be processed will be fed by feeding rollers 7 to station C. While passing through the first set of rollers 7 of the feeding mechanism, the photocells 6 will measure the length of the envelope. This information will be passed to the computer 5 which will use this measurement information in order to precisely position the printer for printing the stamp and the bar code.

Station C

Station C includes the weighing platform and the load cell 16. Station C is directly below the video camera 2. While the operator views the envelopes in order to get the address information, the envelope is simultaneously weighed by the load cell 16. This weight information is transmitted by computer 5, which will utilize this information for the calculation of the postage.

Station D

Station D includes the electronic display unit 1, the video camera 2 and splitter unit 17. The electronic display screen 1 is divided into screen 1-1 and screen 1-2 utilizing the splitter unit 17. The splitter unit allows the electronic display unit 1 to be divided into two sections, allowing two different inputs to be displayed simultaneously on the screen. In screen 1-1 the splitter box allows the computer input to be displayed. In screen 1-2 of the electronic display screen 1, the splitter unit allows a video picture of the envelope to be displayed.

Station E

Figure 3:
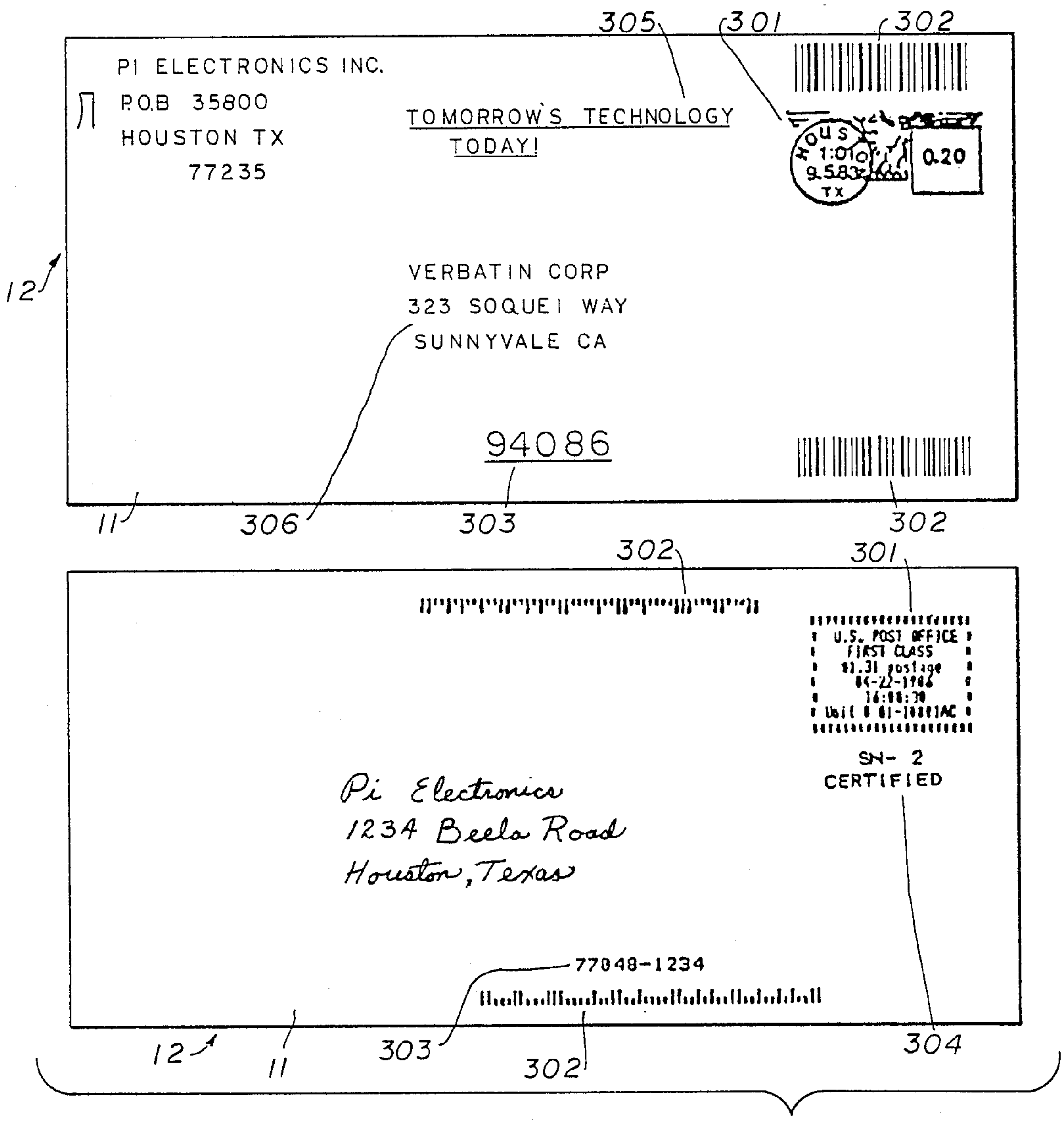
FIG. 3 is a sample of the appearance of two envelopes that has been processed through the apparatus of this invention.

Station E includes the floating head printer 8 and feeding mechanism rollers 7. The envelope 11 to be processed will be automatically fed into station E by feeding mechanism roller 7. The floating head printer 8 will raise itself in the Z direction to allow for the envelope 11 to be processed to be fed into the printing station. Once the envelope 11 to be processed is in position, the floating head printer 8 will automatically lower itself onto the envelope until it makes physical contact with the envelope. At this time, the floating head printer (being previously positioned by the printer to the exact location for printing the stamp and bar code) commences printing of the stamp, value, time, date, location, ZIP+4 bar code in numeric and bar code form, advertising messages and any other information required. The processed envelope 12, FIG. 3, is an example of the automated printing done by the floating-head printer on the face of the envelope 11. 301 is a postmark printed by the printer, 302 is a ZIP+4 barcode printed by the printer, 303 is the numerical ZIP+4 printed by the printer, 304 is a special service identification printed by the printer, 305 is an advertising message printed by the printer, and 306 is address information printed by the printer. However, this printer will print any other information required by the user or the U.S. Postal Service.

The present invention therefore is well adapted to carry out the objects and attain the ends and advantages mentioned as well as others inherent therein. While a presently preferred embodiment is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A computerized and integrated mailing/addressing apparatus, including a series of stations A through E for the steps of preparation, weighing, addressing, encoding, including but not limited to zip coding and bar coding, postage calculating, printing, preparing of manifest, USPS authorized and USPS controlled purchasing printing and totalling of postage, and collating of outgoing mail envelopes by a series of computer controlled feeds into computer selected chutes for transfer in encoded groups into the Post Office, the envelopes have now been preprocessed, for direct and fully compatible harmonious automated reception by and entry into the state of the art United States Post Office plant, whereby the interface of the preprocessed envelopes with the receiving apparatus in any state of the art United States Post Office plant, is a compatible harmonious automated step, in effect extending the state of the art automated Post Office apparatus to include the computer assisted generation, printing and encoding on said outgoing envelopes, including the computer sided purchasing of and accounting for postage used, in the mailing process, the improvements and extensions, stations and steps, comprising, in combination:

Station A contains computer means, disc drive means, and keyboard means for entering address information, which is viewable at Station D, into the computer, said disc drive means containing ZIP+4 Directory memory means, postal rates, operating programs, mailing list programs, and postage record keeping programs;

Station B contains envelope feeding means, and photocell means, said envelope is fed through said feeding means, length and aspect of ratio data for said envelope is measured by said photocells, and said data is entered into said computer, which positions said floating printer for precisely printing a postmark and said barcode in Station E;

Station C contains load cell means, and said envelope is weighed by said load cell, and the weight data is entered into said computer which will calculate the postage due;

Station D contains electronic display means, split screen means, and video means, said split screen means allowing said computer input and a video picture of said envelope from said video means to be viewed simultaneously on said display means, for implementation of Step A;

Station E contains an exit chute means, a series of feeding means, and said floating head printer, which raises itself to allow said envelope to be properly positioned, then lowers itself to print automatically on said envelope said information from Station A and said postage and said ZIP+4 Code, said Code is printed numerically and as said bar code, said bar code precisely located in at least one specified location on said envelope, said printing means automatically adapts for said envelopes of any size and thickness; said computer controls said feeding means to feed said envelopes into at least one computer selected chute like means, each of said chutes having means for direct interface and entry into said state of the art Post Office envelope processing plant; and simultaneously automatically computing and printing said manifest of postage used and credit due said mailing operator resulting from savings by use of said apparatus.

2. A computerized and integrated mailing/addressing apparatus as recited in claim 1, in which said apparatus includes video display means for visually displaying input of said address on said envelope by said mailing operator, and simultaneously displaying of said address in said computer.

3. A computerized and integrated mailing/addressing apparatus as defined in claim 1, in which said computer for controlling the positioning of said floating printer, calculates the size and aspect ratio of said envelope, for printing of said postmark and said ZIP+4 bar code.

4. A computerized and integrated mailing/addressing apparatus as recited in claim 1, in which said computer prints at least the data, the time, the barcode, and the address as an integral part of said postmark.

5. A computerized and integrated mailing/addressing apparatus as recited in claim 1, in which said ZIP+4 Code Directory memory means includes:
 means to enter said address information;
 memory means including means containing said ZIP+4 Directory means; and
 computer and computer interface means, said apparatus having means for conducting a search of said ZIP+4 Code memory for said address.

6. A computerized and integrated mailing/addressing apparatus as recited in claim 5, in which said ZIP+4 Code Directory memory means includes:
 means to enter said address information;
 memory means comprised of one of the group of ROM, hard disk or optoelectronic discs; and
 computer and computer interface means, said apparatus having means for conducting a search of said ZIP+4 code memory for said address.

7. A computerized and integrated mailing/addressing apparatus as recited in claim 1, in which said purchasing of and accounting for said postage remains at all times under the control of the United States Postal Service, said USPS controlled functions further including loading of said postage, authorization for use of said Postage Control Unit, and issuing of credits earned by said user through use of said apparatus.

8. A computerized and integrated mailing/addressing apparatus as recited in claim 7, in which said purchasing of and accounting for said postage remains at all times under the encrypted electronic control of the United States Postal Service.

9. A computerized and integrated mailing/addressing method in which the mailer of at least one envelope, legibly addressed in a natural or an USPS machine readable language, may safely and securely process the envelope from a USPS approved deposit station into and through the USPS bar coding machine, the movement of the envelopes to and through the processing stations being fully automatic, the method comprising at least the following steps:
 weighing automatically the individual envelopes to be mailed;
 entering automatically address information into the computer;
 confirming automatically the correct code from the ZIP+4 Directory and adding it if necessary to the envelope;
 selecting the desired postal rate;
 automatically calculating correct postage for said envelope using said weight of said envelope, said ZIP+4 Code, and said postal rate;
 printing automatically on said envelope by the floating head printing means, wherein said printing means automatically adapts for said envelopes of any size and thickness, and wherein said printing includes printing of a postmark and said ZIP+4 code, wherein said code is printed in both numerical and bar code formats, and is precisely located in at least one precisely specified location on said envelope;
 moving said envelope automatically through said steps in said method, including automatically selecting by said bar code means, at least one feeding chute, said chute having interfacing means facilitating the collating of said envelopes within said chutes to the extent possible in conformance with and direct harmonious entry into the USPS envelope sorting system; and
 simultaneously automatically computing and printing a manifest of postage used and credit due to said mailer resulting from savings of use of said method, whereby user is provided with a computerized postage record keeping system.

* * * * *